(12) United States Patent
Kim et al.

(10) Patent No.: US 9,179,486 B2
(45) Date of Patent: Nov. 3, 2015

(54) DEVICE AND METHOD FOR SETTING A GROUP OWNER INTENT VALUE BASED ON A COMPARISON OF GROUP OWNER INTENT VALUES

(71) Applicant: LG ELECTRONICS INC., Seoul (KR)

(72) Inventors: Jungwoo Kim, Seoul (KR); Jinho Kim, Seoul (KR); Suhwook Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 121 days.

(21) Appl. No.: 14/024,476

(22) Filed: Sep. 11, 2013

(65) Prior Publication Data

US 2014/0079045 A1 Mar. 20, 2014

Related U.S. Application Data

(60) Provisional application No. 61/702,255, filed on Sep. 18, 2012.

(30) Foreign Application Priority Data

Aug. 29, 2013 (KR) .......................... 10-2013-0103107

(51) Int. Cl.
*H04W 76/02* (2009.01)
*H04W 4/08* (2009.01)
*H04W 84/20* (2009.01)
*H04W 4/00* (2009.01)
*H04W 4/20* (2009.01)
*H04W 8/00* (2009.01)

(52) U.S. Cl.
CPC ............ *H04W 76/023* (2013.01); *H04W 4/008* (2013.01); *H04W 4/08* (2013.01); *H04W 4/203* (2013.01); *H04W 84/20* (2013.01); *H04W 8/005* (2013.01)

(58) Field of Classification Search
CPC ............................ H04W 48/20; H04W 76/023
See application file for complete search history.

(56) References Cited

U.S. PATENT DOCUMENTS

| | | | |
|---|---|---|---|
| 2007/0242665 A1* | 10/2007 | Habetha et al. | 370/389 |
| 2011/0188391 A1* | 8/2011 | Sella et al. | 370/252 |
| 2011/0225305 A1 | 9/2011 | Vedantham et al. | |
| 2012/0224569 A1 | 9/2012 | Kubota | |
| 2013/0045678 A1 | 2/2013 | Lee | |
| 2015/0180970 A1* | 6/2015 | Verma et al. | 28/16 |

FOREIGN PATENT DOCUMENTS

| | | |
|---|---|---|
| EP | 2557825 | 2/2013 |
| JP | 2004-080671 | 3/2004 |
| JP | 2014-027468 | 2/2014 |

OTHER PUBLICATIONS

European Patent Office Application Serial No. 13183816.1, Search Report dated Feb. 20, 2014, 12 pages.

* cited by examiner

*Primary Examiner* — Hassan Kizou
*Assistant Examiner* — Ashil Farahmand
(74) *Attorney, Agent, or Firm* — Lee, Hong, Degerman, Kang & Waimey

(57) ABSTRACT

A device and method for performing inter-device communication are disclosed. An inter-device communication method of a first device includes searching for a second device supporting inter-device communication, receiving network information from the searched second device, and determining that one of the first and second devices is a group owner based on the received network information of the second device and network information of the first device. The network information includes at least one selected from among type information indicating a server device or a client device, network support information, network necessity information, and network setting information.

10 Claims, 5 Drawing Sheets

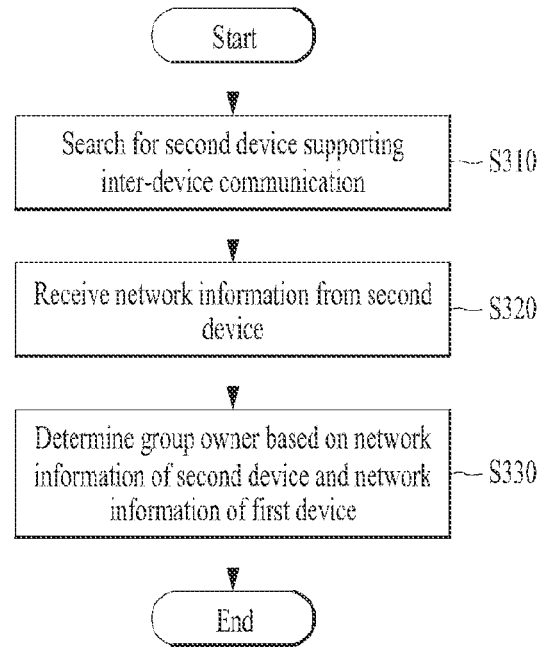
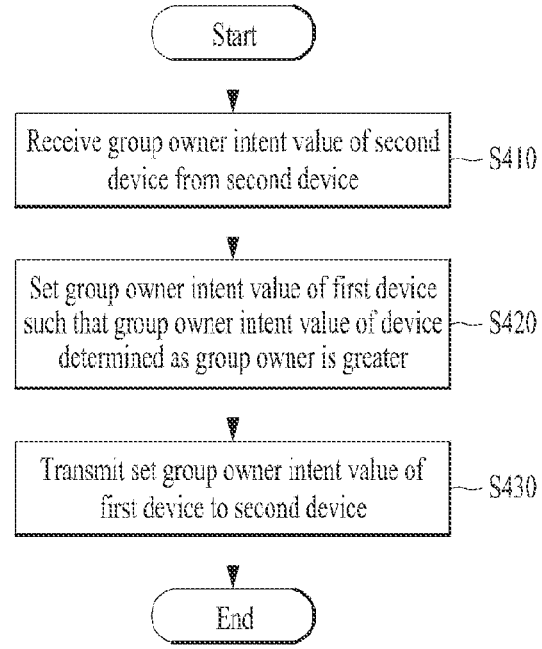

DEVICE AND METHOD FOR SETTING A GROUP OWNER INTENT VALUE BASED ON A COMPARISON OF GROUP OWNER INTENT VALUES

CROSS REFERENCE TO RELATED APPLICATIONS

This application claims the benefit of U.S. Provisional Application No. 61/702,255, filed on Sep. 18, 2012, and also claims the benefit of earlier filing date and right of priority to Korean Patent Application No. 10-2013-0103107 filed on Aug. 29, 2013, the contents of which are all hereby incorporated by reference in their entirety.

BACKGROUND OF THE INVENTION

1. Field of the Invention

The present invention relates to inter-device communication and, more particularly, to a device and method for performing communication using Wi-Fi Direct.

2. Discussion of the Related Art

Inter-device communication may include Wi-Fi Direct, Bluetooth, and Zigbee. Wi-Fi is a wireless local area network (LAN). Wi-Fi is a communication network which enables users to access ultra high speed Internet in the vicinity of an access point (AP). Wi-Fi Direct is a new version of existing Wi-Fi. Wi-Fi Direct is a communication technology for wireless connection between devices using Wi-Fi without the Internet. Wi-Fi Direct does not require a hot spot, a router, and an access point (AP). Devices supporting Wi-Fi Direct may be directly connected to each other to transmit and receive files or share a communication network.

As described above, Wi-Fi Direct is a kind of direct communication between devices equipped with Wi-Fi without using an access point (AP) supporting connection between Wi-Fi Alliance devices.

Basically, Wi-Fi Direct interconnects two devices in a one-to-one connection mode. A smartphone may be directly connected to another smartphone, a mouse may be directly connected to a laptop computer, or a tablet PC may be directly connected to a printer using Wi-Fi Direct. As a result, pictures, music files, or moving images stored in a smartphone may be easily transmitted to another smartphone, documents or pictures stored in a tablet PC may be directly printed, addresses stored in a PC may be synchronized with addresses in a smartphone, or game consoles may be directly connected to each other for users to enjoy games.

A plurality of devices may be connected to one device. For example, a monitor, a printer, a digital camera, and a mouse may be simultaneously connected to a laptop computer supporting Wi-Fi Direct. At this time, in a case in which the laptop computer accesses an existing Wi-Fi network, the devices connected to the laptop computer may access the Internet via the Wi-Fi network in the same manner. However, a one-to-many mode is optional.

Meanwhile, Wi-Fi Direct devices decide a device to function as an AP when initial connection between the devices is performed. A device connection method in Wi-Fi Direct is as follows. Devices supporting Wi-Fi Direct transmit and receive a control message to and from each other to recognize which device supports Wi-Fi Direct and transmit information necessary for interconnection to each other through a control message. This method includes a procedure of negotiating which of two different Wi-Fi Direct devices serves as a group owner. The group owner means one selected from a device group constituting a Wi-Fi Direct network having a right to control the device connected thereto and serving as an AP. In the negotiation procedure, group owner intent values of the two devices are exchanged to decide which of the devices serves as the group owner.

In the conventional Wi-Fi Direct connection, predetermined group owner intent values, which may be any values, are generally compared with each other to decide a group owner. As a result, efficient network connection is not achieved. For example, a specific device may not be controlled to be the group owner.

SUMMARY OF THE INVENTION

Accordingly, the present invention is directed to a device and method for performing inter-device communication that substantially obviate one or more problems due to limitations and disadvantages of the related art.

An object of the present invention is to provide a communication method that is capable of determining a group owner during Wi-Fi Direct connection in consideration of network information.

Another object of the present invention is to provide a device and method for performing communication that is capable of dynamically changing a group owner intent value of the device in correspondence to a group owner determined to be suited to a specific network condition.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, an inter-device communication method of a first device includes searching for a second device supporting inter-device communication, receiving network information from the searched second device, and determining that one of the first and second devices is a group owner based on the received network information of the second device and network information of the first device, wherein the network information includes at least one of type information indicating a server device or a client device, network support information, network necessity information, and network setting information.

The step of determining that one of the first and second devices is the group owner may include determining the group owner using the received network information of the second device and the network information of the first device according to a group owner determination criterion.

The inter-device communication method may further include receiving a group owner intent value of the second device from the second device and comparing a group owner intent value of the first device with the group owner intent value of the second device to set the group owner intent value of the first device such that the group owner intent value of the device determined as the group owner is greater than the group owner intent value of the device determined as the group client.

Upon determining that the first device is the group owner, the step of setting the group owner intent value of the first device may further include comparing the group owner intent value of the first device with the group owner intent value of the second device and, in a case in which the group owner intent value of the first device is less than the group owner intent value of the second device as a result of comparison, setting the group owner intent value of the first device such that the group owner intent value of the first device is greater than the group owner intent value of the second device.

Upon determining that the first device is the group client, the step of setting the group owner intent value of the first device may further include comparing the group owner intent value of the first device with the group owner intent value of the second device and, in a case in which the group owner intent value of the first device is greater than the group owner intent value of the second device as a result of comparison, setting the group owner intent value of the first device such that the group owner intent value of the first device is less than the group owner intent value of the second device.

The inter-device communication method may further include transmitting the set group owner intent value of the first device to the second device.

In another aspect of the present invention, a first device for performing inter-device communication includes a receiver to search for a second device supporting inter-device communication and to receive network information from the searched second device and a processor to determine that one of the first and second devices is a group owner based on the received network information of the second device and network information of the first device, wherein the network information includes at least one of type information indicating a server device or a client device, network support information, network necessity information, and network setting information.

The processor may determine the group owner using the received network information of the second device and the network information of the first device according to a group owner determination criterion.

The receiver may receive a group owner intent value of the second device from the second device and the processor may compares a group owner intent value of the first device with the group owner intent value of the second device to set the group owner intent value of the first device such that the group owner intent value of the device determined as the group owner is greater than the group owner intent value of the device determined as the group client.

Upon determining that the first device is the group owner, the processor may compare the group owner intent value of the first device with the group owner intent value of the second device and, in a case in which the group owner intent value of the first device is less than the group owner intent value of the second device as a result of comparison, set the group owner intent value of the first device such that the group owner intent value of the first device is greater than the group owner intent value of the second device.

Upon determining that the first device is the group client, the processor may compare the group owner intent value of the first device with the group owner intent value of the second device and, in a case in which the group owner intent value of the first device is greater than the group owner intent value of the second device as a result of comparison, set the group owner intent value of the first device such that the group owner intent value of the first device is less than the group owner intent value of the second device.

The first device may further include a transmitter to transmit the set group owner intent value of the first device to the second device.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 3 is a flowchart illustrating a method of determining a group owner of Wi-Fi Direct according to an embodiment of the present invention;

FIG. 4 is a flowchart illustrating a setting method of a group owner intent value according to an embodiment of the present invention;

DETAILED DESCRIPTION OF THE INVENTION

The following detailed description includes detailed matters to provide full understanding of the present invention. However, it will be apparent to those skilled in the art that the present invention can be carried out without the detailed matters. For example, the following detailed description will be given on the assumption that a mobile communication system is an Institute of Electrical and Electronics Engineers (IEEE) 802.16 mobile communication system or a Third Generation Partnership Project (3GPP) mobile communication system. However, the present invention is applicable to any other mobile communication systems except unique items of IEEE 802.16 or 3GPP. In some instances, well-known structures and devices may be omitted in order to avoid obscuring the concepts of the present invention and important functions of each structure and each device may be shown in a block diagram form.

In the following description, it is assumed that a terminal device is a generic term for mobile or fixed user-end devices, such as a User Equipment (UE), a Mobile Station (MS), and an Advanced Mobile Station (AMS). In addition, it is assumed that a base station is a generic term for any nodes, such as a Node B, an eNode B, a Base Station (BS), and an Access Point (AP), located at a network end to communicate with a terminal device.

A terminal device may transmit or receive data and various kinds of control information. Various physical channels are present based on kind and use of information transmitted or received by the terminal device.

Reference will now be made in detail to the preferred embodiments of the present invention, examples of which are illustrated in the accompanying drawings. The detailed description, which will hereinafter be given with reference to the accompanying drawings, is intended to explain exemplary embodiments of the present invention, rather than to show the only embodiments that can be implemented according to the present invention.

The present invention relates to a terminal device supporting inter-device communication. The inter-device communication may include Wi-Fi Direct, Bluetooth, and Zigbee. Hereinafter, Wi-Fi Direct will be described as the inter-device communication for the convenience of description.

Figure 1:
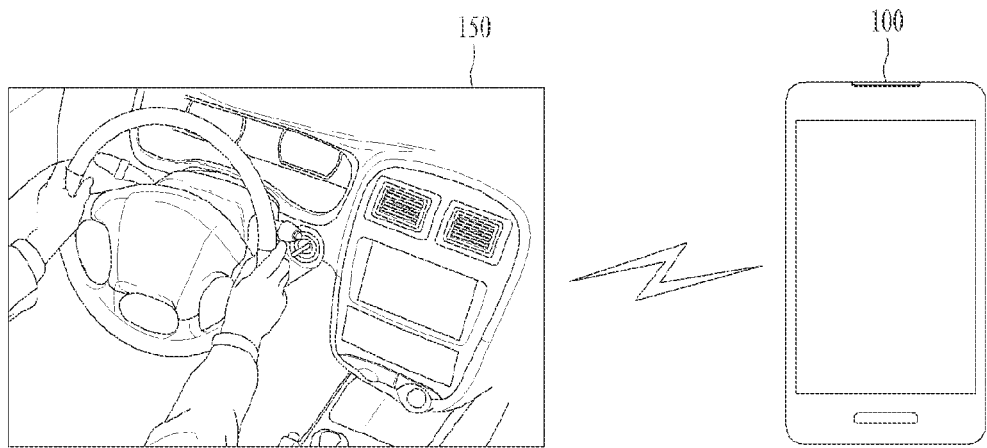
FIG. 1 is a view showing configuration of a Wi-Fi Direct network.

FIG. 1 is a view showing configuration of a Wi-Fi Direct network.

Wi-Fi is wireless communication technology widely used under IEEE 802.11 standards all over the world. Wi-Fi is used in various devices, such as a laptop computer, a mobile phone, a game console, an MP3 player, a camera, and a printer. Wi-Fi is accepted as a representative technology of a wireless local area network (WLAN) for accessing the Internet. In Wi-Fi, communication is performed based on an access point (AP). For this reason, Wi-Fi installed in various kinds of devices has a structure to perform communication through access to an AP.

On the other hand, the Wi-Fi Alliance (WFA) has proposed a new standard for Wi-Fi Direct supporting Peer to Peer (P2P) communication between Wi-Fi devices. Wi-Fi Direct is a wireless communication technology enabling direct communication between devices equipped with Wi-Fi without using an access point (AP) supporting connection between Wi-Fi devices.

Basically, Wi-Fi Direct interconnects two devices in a one-to-one connection mode. A smartphone may be directly connected to another smartphone, a mouse may be directly connected to a laptop computer, or a tablet PC may be directly connected to a printer using Wi-Fi Direct. As a result, pictures, music files, or moving images stored in a smartphone may be easily transmitted to another smartphone, documents or pictures stored in a tablet PC may be directly printed, addresses stored in a PC may be synchronized with addresses in a smartphone, or game consoles may be directly connected to each other for users to enjoy games.

Referring to FIG. 1, a mobile terminal device 100 and a vehicle head unit 150 may perform communication with each other using a Wi-Fi Direct technology. In this way, the Wi-Fi Direct technology may achieve connection between the mobile terminal device 100 and the vehicle head unit 150 to share navigation, TV output, music reproduction, social network service, and vehicle information display.

In FIG. 1, one mobile terminal device 100 and one vehicle head unit 150 are connected to each other using Wi-Fi Direct. According to circumstances, however, a plurality of mobile terminal devices and one vehicle head unit or one mobile terminal device and a plurality of vehicle head units may be connected to each other using Wi-Fi Direct.

In another embodiment, a monitor, a printer, a digital camera, and a mouse may be simultaneously connected to a laptop computer supporting Wi-Fi Direct. At this time, in a case in which the laptop computer accesses an existing Wi-Fi network, the devices connected to the laptop computer may access the Internet via the Wi-Fi network in the same manner. However, a one-to-many mode is optional.

Figure 2:
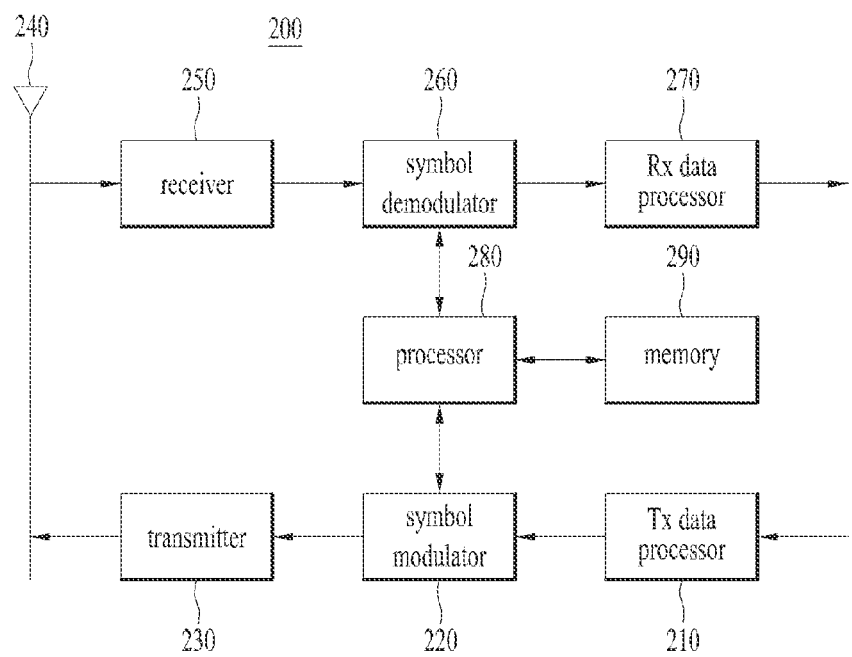
FIG. 2 is a block diagram showing configuration of a device for performing communication using Wi-Fi Direct.

FIG. 2 is a block diagram showing configuration of a device 200 for performing communication using Wi-Fi Direct. The mobile terminal device 100 and the vehicle head unit 150 of FIG. 1 supporting Wi-Fi Direct may include all configurations of the device 200 described with reference to FIG. 2.

Referring to FIG. 2, the device 200 for performing communication using Wi-Fi Direct may include a transmit (Tx) data processor 210, a symbol modulator 220, a transmitter 230, a transmit-receive antenna 240, a receiver 250, a symbol demodulator 260, a receive data processor 270, a processor 280, and a memory 290. Although one transmit-receive antenna 240 is shown in FIG. 2, the device 200 may include a plurality of transmit-receive antennas. Consequently, the device 200 according to the present invention supports a Multiple Input Multiple Output (MIMO) system. In addition, the device 200 according to the present invention may support both a Single User-MIMO (SU-MIMO) mode and a Multi User-MIMO (MU-MIMO) mode.

The transmit data processor 210 receives traffic data, formats and codes the received traffic data, and interleaves and modulates (or symbol maps) the coded traffic data to provide modulated symbols ("data symbols"). The symbol modulator 220 receives and processes the data symbols and pilot symbols to provide a stream of symbols.

The symbol modulator 220 multiplexes the data symbols and the pilot symbols and transmits the multiplexed data symbols and the multiplexed pilot symbols to the transmitter 230. At this time, each transmit symbol may be a data symbol, a pilot symbol, or a null signal value. In each symbol cycle, the pilot symbols may be successively transmitted. The pilot symbols may be frequency division multiplexing (FDM) symbols, orthogonal frequency division multiplexing (OFDM) symbols, time division multiplexing (TDM) symbols, or code division multiplexing (CDM) symbols.

The transmitter 230 receives a stream of symbols, converts the received stream of symbols into one or more analog signals, and additionally adjusts (for example, amplifies, filters, and frequency up-converts) the analog signals to generate a signal suitable for transmission through a wireless channel. The transmit antenna 240 transmits the generated signal to another device.

Meanwhile, the receive antenna 240 receives a signal from another device and provides the received signal to the receiver 250. The receiver 250 adjusts (for example, filters, amplifies, and frequency down-converts) the received signal and digitizes the adjusted signal to acquire samples. The symbol demodulator 260 demodulates the received pilot symbols and provides the demodulated pilot symbols to the processor for channel estimation.

In addition, the symbol demodulator 260 receives a frequency response estimate value from the processor 155, performs data demodulation with respect to the received data symbols to acquire data symbol estimate values (which are estimate values of the transmitted data symbols), and provides the data symbol estimate values to the receive (Rx) data processor 270. The receive data processor 270 demodulates (i.e. symbol demaps), deinterleaves, and decodes the data symbol estimate values to restore the transmitted traffic data.

Processes performed by the symbol demodulator 260 and the receive data processor 270 are complementary to processes performed by the symbol modulator 220 and the transmit data processor 210.

The processor 280 instructs (for example, controls, adjusts, manages, etc.) operation of the device 200. The processor 280 may be connected to the memory 290, which stores program code and data. The memory 290 is connected to the processor 280 to store an operating system, applications, and general files.

The processor 280 may also be referred to as a controller, a microcontroller, a microprocessor, or a microcomputer. Meanwhile, the processor 280 may be implemented by hardware, firmware, software, or a combination thereof In a case in which embodiments of the present invention are implemented using hardware, application specific integrated circuits (ASICs), digital signal processors (DSPs), digital signal processing devices (DSPDs), programmable logic devices (PLDs), or field programmable gate arrays (FPGAs) configured to perform the present invention may be provided in the processor 280.

On the other hand, in a case in which embodiments of the present invention are implemented using firmware or software, the firmware or the software may be configured to include modules, procedures, or functions to perform functions or operations of the present invention. The firmware or the software configured to perform the present invention may be provided in the processor 280 or stored in the memory 290 such that the firmware or the software is driven by the processor 280.

In addition to the components shown in FIG. 2, the device 200 according to the present invention may further several other components as needed. For example, in a case in which the device 200 is a mobile terminal device, the device 200 may further include an audio/video input unit, such as a camera and a microphone, to allow input of audio and video signals, a user input unit, such as a button, a touch sensor, a keypad, to allow input of user operation control, a sensing unit to sense states of the mobile terminal device, e.g. the position, orientation, acceleration, and deceleration of the mobile terminal device and user contact with the mobile terminal device, an output unit, such as a display, a speaker, and a haptic motor, to generate an output related to visual sensation, auditory sensation, or tactile sensation, an interface unit, such as a wired/wireless headset port, an external charge port, an earphone port, and a memory card port, to allow connection of the mobile terminal device with an external device, and a power supply unit connected to an external power source or an internal power source to supply power necessary to operate the respective components under control of the processor in addition to the components to perform wireless communication shown in FIG. 2.

Hereinafter, an embodiment related to a wireless communication method which may be implemented by the device with the above-stated configuration will be described with reference to the accompanying drawings.

For the convenience of description, it is assumed that the device for performing inter-device communication according to the present invention includes at least one of the components shown in FIG. 2. A first device and a second device, which will hereinafter be described, are concepts used to describe the device to which the present invention is applied in a state in which the device to which the present invention is applied is divided into a receive side and a transmit side. In addition, it is assumed that the first device and the second device belong to the same network group.

Specifically, a first device for performing inter-device communication according to the present invention may include a receiver to search for a second device supporting inter-device communication and to receive service information from the searched second device and a processor to determine that one of the first and second devices is a group owner based on the received service information of the second device and network information of the first device. The network information may include at least one of type information indicating a server device or a client device, network support information, network necessity information, and network setting information.

According to circumstances, the first device may be designed to further include a transmitter to transmit a group owner intent value of the first device to the second device.

Otherwise, the first device may further include a memory to store the group owner intent value and the network information of the first device, network information received from the second device, and a group owner intent value of the second device.

Hereinafter, a method of determining a group owner of Wi-Fi Direct according to the present invention will be described with reference to FIG. 3 based on the above assumption.

FIG. 3 is a flowchart illustrating a method of determining a group owner of Wi-Fi Direct according to an embodiment of the present invention.

Referring to FIG. 3, a first device according to an embodiment of the present invention may search for a second device supporting Wi-Fi Direct (S310). Specifically, the first device may sense a beacon signal transmitted from the second device located in the vicinity of the first device and perform a device discovery procedure to detect the second device supporting Wi-Fi Direct.

After step S310, the first device may receive network information from the searched second device (S320). The network information may include at least one of type information indicating a server device or a client device, network support information, network necessity information, network status information, and network setting information. An embodiment of network information according to the present invention is described in Table 1. The network information may be transmitted through a device discovery procedure.

In the present invention, the type information is information indicating a server device capable of functioning as a server on a network and a client device capable of functioning as a client on a network.

The network support information means information regarding networks supported by a device. For example, the network support information may include information regarding the number of network types supported by a device, a list of network types supported by a device, and whether a network is extended to a connected device or Internet access is supported for the connected device.

The network necessity information means information regarding whether network connection is necessary to operate a device. For example, the network necessity information may be information indicating whether access to the Internet is necessary to operate a device.

The network status information means information regarding overall status and setting of a network. For example, the network status information may include network connection status information, signal strength information, and information regarding whether multiple connections are supported.

TABLE 1

| Field | Size (octets) | Value | Description |
|---|---|---|---|
| Device Type | 1 | Variable | Information indicating server device or client device |
| Number of Network Types Supported | 1 | Variable | Number of network types supported |

TABLE 1-continued

| Field | Size (octets) | Value | Description |
|---|---|---|---|
| Network Type List | Variable | | List of network types supported |
| Active Network Type | 1 | Variable | Type of network in use |
| Connectivity Status | 1 | Variable | Status information of network in use |
| Signal Strength | 1 | Variable | Information regarding signal strength of network in use |
| Data Roaming Status | 1 | Variable | Roaming information |

Meanwhile, the first device may receive service information from the searched second device. The service information may be device attribute information. As described in Table 2, the service information may be P2P attribute ID definitions for Wi-Fi Direct.

TABLE 2

| Attribute ID | Note |
|---|---|
| 0 | Status |
| 1 | Minor Reason Code |
| 2 | P2P Capability |
| 3 | P2P Device ID |
| 4 | Group Owner Intent |
| 5 | Configuration Timeout |
| 6 | Listen Channel |
| 7 | P2P Group BSSID |
| 8 | Extended Listen Timing |
| 9 | Intended P2P Interface Address |
| 10 | P2P Manageability |
| 11 | Channel List |
| 12 | Notice of Absence |
| 13 | P2P Device Info |
| 14 | P2P Group Info |
| 15 | P2P Group ID |
| 16 | P2P Interface |
| 17 | Operating Channel |
| 18 | Invitation Flags |

TABLE 2-continued

| Attribute ID | Note |
|---|---|
| 19-220 | Reserved |
| 221 | Vendor Specific Attribute |
| 222-255 | Reserved |

Meanwhile, the first device having received the service information may determine whether Wi-Fi Direct connection is car connectivity service-based Wi-Fi Direct connection based on the service information. Upon determining that the Wi-Fi Direct connection is the car connectivity service-based Wi-Fi Direct connection, the first device may proceed to the next step, i.e. step S330. On the other hand, upon determining that the Wi-Fi Direct connection is not the car connectivity service-based Wi-Fi Direct connection, the first device may proceed to a group owner negotiation step based on general Wi-Fi Direct connection. This determination may be performed using car connectivity service information which may be defined in one of the Reserved fields of Table 2. Car connectivity service attribute ID information may be determined with reference to an Attribute ID field of Table 3 below. However, determination as to whether the Wi-Fi Direct connection is the car connectivity service-based Wi-Fi Direct connection is optional and thus may be omitted.

TABLE 3

| Field | Size (octets) | value | Description |
|---|---|---|---|
| Attribute ID | 1 | 19-220, 222-255 | Identifying the type of P2P attribute. |
| Length | 5 | | Length of the following fields in the attribute |
| MirrorLink MajorVersion | 1 | Variable | Information about the major version of MirrorLink the device supports |
| MirrorLink MinorVersion | 1 | Variable | Information about the minor version of MirrorLink the device supports |
| MirrorLink SubminorVersion | 1 | Variable | Information about the sub-minor version of MirrorLink the device supports |
| Device Type | 1 | Variable | Indicating the device type between MirrorLink Server and MirrorLink Client. If it is set to 0, it indicates the P2P Device is MirrorLink Server. If it is set to 1, it indicates the P2P Device is MirrorLink Client |
| GO request | 1 | Variable | Information that is used to decide if P2P Device received this attribute information needs to re-configure its GO Intent value. |

Meanwhile, the network information described in Table 1 and the service information described in Tables 2 and 3 may be acquired through a Device Discovery frame or a Group Owner (GO) Negotiation frame. The Device Discovery frame is a frame transmitted and received in a Device Discovery Procedure and the Group Owner (GO) Negotiation frame is a frame transmitted and received in a GO formation Procedure, which will hereinafter be described with reference to FIGS. 6 and 7. In this specification, the network information of Table 1 is described as information separated from the service information of Tables 2 and 3. However, the network information and the service information may constitute united information.

After step S320, the first device may compare the received network information of the second device with network information of the first device to determine that one of the first and second devices is a group owner (S330).

Specifically, at least one of the type information, the network support information, the network necessity information, and the network status information may be extracted from the network information of the first device and the second device. In addition, the type information, the network support information, the network necessity information, and the network status information may be compared to determine a group owner according to a group owner determination criterion. The group owner determination criterion may be prestored in the device or may be directly input by a user whenever a Wi-Fi Direct function is used.

TABLE 4

| | Type information | Network support information | Network necessity information | Network status information |
|---|---|---|---|---|
| First device | Server device | Internet accessible 4G LTE | Necessary | Under Internet access High signal strength Multiple connections impossible |
| Second device | Client device | Internet accessible GPRS | Unnecessary | No Internet access Low signal strength Multiple connections possible |

For example, in a case in which the first device and the second device have the network information described in Table 4, the first device may determine that the first device is a group owner in consideration of the type information, the network support information, the network necessity information, and the network status information.

Hereinafter, a setting method of a group owner intent value will be described in detail with reference to FIG. 4. FIG. 4 is a flowchart showing operations performed after step S330 of FIG. 3. It is assumed that steps S310 to S330 have been performed.

Referring to FIG. 4, the first device may receive a message containing the group owner intent value of the second device from the second device (S410). Specifically, the first device may receive a GO Negotiation Request message from the second device. The GO Negotiation Request message may further contain the service information described in Tables 1 and 2 in addition to the group owner intent value. The group owner intent value is a value used to decide the group owner.

In Wi-Fi Direct, the group owner intent value is set to a minimum of 0 and a maximum of 15.

The first device may compare the group owner intent value of the first device with the group owner intent value of the second device to set the group owner intent value of the first device such that the group owner intent value of the device determined as the group owner is greater than the group owner intent value of the device determined as the group client (S420). In Wi-Fi Direct, group owner intent values of devices that are connected to each other may be compared with each other and the device having the greater group owner intent value may be decided as the group owner. Consequently, the first device may adjust the group owner intent value of the first device such that the group owner intent value of the first device corresponds to the group owner and the group client determined at step S330. In a case in which the group owner intent value of the first device corresponds to the group owner determined at step S330, however, the first device may use the group owner intent value of the first device without adjustment of the group owner intent value of the first device. For example, in a case in which the first device is determined as the group owner, the group owner intent value of the first device is '10', and the group owner intent value of the second device is '11', the first device may adjust the group owner intent value '10' of the first device to '12-15' such that the group owner intent value of the first device is greater than the group owner intent value '11' of the second device. On the other hand, in a case in which the first device is determined as the group client, the group owner intent value of the first device is '10', and the group owner intent value of the second device is '9', the first device may adjust the group owner intent value '10' of the first device to '0-9' such that the group owner intent value of the first device is less than the group owner intent value '9' of the second device. However, in a case in which the first device is determined as the group owner, the group owner intent value of the first device is '10', and the group owner intent value of the second device is '9', the first device may use the group owner intent value of the first device without adjustment of the group owner intent value of the first device since the group owner intent value of the first device is greater than the group owner intent value of the second device. A method of setting the group owner intent value of the first device will hereinafter be described in detail with reference to FIG. 5.

The first device may transmit a message containing the set group owner intent value of the first device to the second device (S430). Specifically, the first device may transmit a GO Negotiation Response message containing the group owner intent value of the first device set at step S420 to the second device.

Figure 5:
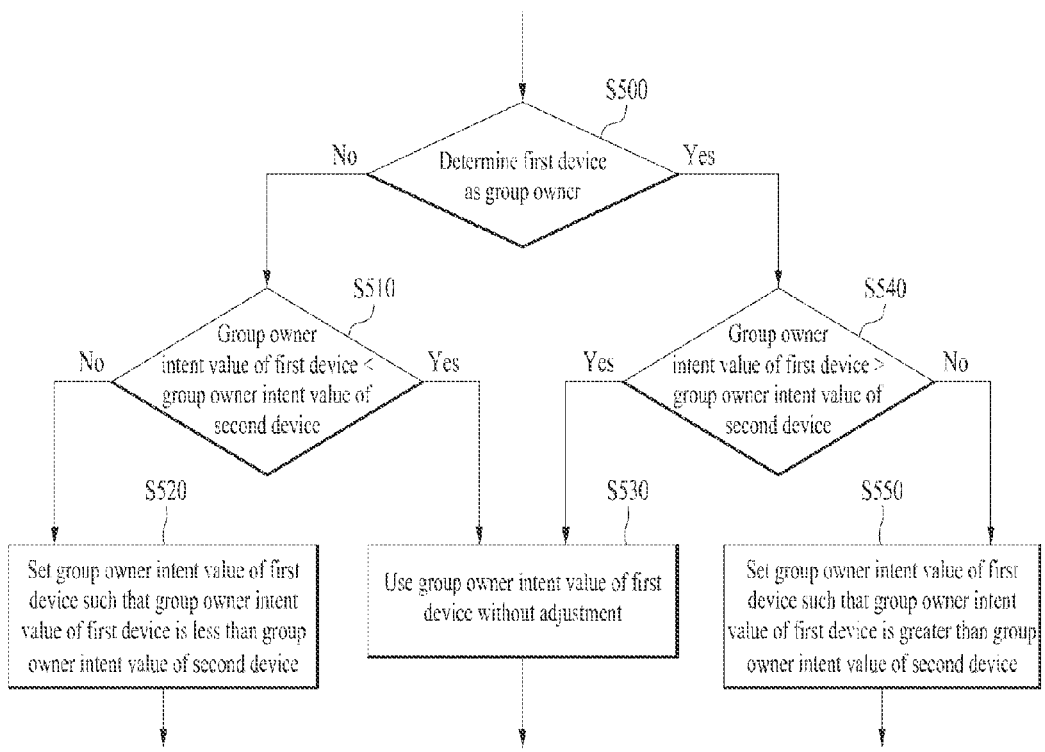
FIG. 5 is a flowchart illustrating the setting method of the group owner intent value according to the embodiment of the present invention in detail.

Hereinafter, the setting method of the group owner intent value will be described in detail with reference to FIG. 5. FIG. 5 is a flowchart showing details of step S420. It is assumed that steps S310 to S410 have been performed.

Referring to FIG. 5, the first device may determine whether the first device is determined as the group owner. Upon determining that the first device is the group client (NO of S500), the first device may compare the group owner intent value of the first device with the group owner intent value of the second device. In a case in which the group owner intent value of the first device is greater than the group owner intent value of the second device as the result of comparison (NO of S510), the first device may set the group owner intent value of the first device such that the group owner intent value of the first device is less than the group owner intent value of the second device (S520). On the other hand, in a case in which the group owner intent value of the first device is less than the group owner intent value of the second device as the result of comparison (YES of S510), the first device may use the group owner intent value of the first device without adjustment of the group owner intent value of the first device (S530).

Meanwhile, upon determining that the first device is the group owner (YES of S500), the first device may compare the group owner intent value of the first device with the group owner intent value of the second device. In a case in which the group owner intent value of the first device is less than the group owner intent value of the second device as the result of comparison (NO of S540), the first device may set the group owner intent value of the first device such that the group owner intent value of the first device is greater than the group owner intent value of the second device (S550). On the other hand, in a case in which the group owner intent value of the first device is greater than the group owner intent value of the second device as the result of comparison (YES of S540), the first device may use the group owner intent value of the first device without adjustment of the group owner intent value of the first device (S530).

In FIG. 5, the group owner intent value of the first device is set. However, the group owner intent value of the second device may be set such that the group owner intent value of the device determined as the group owner is greater than the group owner intent value of the device determined as the group client. In this case, the set group owner intent value of the second device may be transmitted to the second device in a state in which the set group owner intent value of the second device is contained in the GO Negotiation Response message. As described above, the group owner intent value of the second device may be adjusted and set instead of the group owner intent value of the first device such that the group owner intent value of the device determined as the group owner is greater than the group owner intent value of the device determined as the group client. In a case in which it is necessary to adjust the group owner intent value (NO of S510 or NO of S540), the first device may allow a user to select and adjust the group owner intent value of the first device or the set group owner intent value of the second device.

The group owner intent value may be dynamically set using the communication method as described above, thereby deciding a group owner suited to a specific condition.

Hereinafter, a communication procedure using Wi-Fi Direct according to an embodiment of the present invention will be described with reference to FIGS. 6 and 7.

Figure 6:
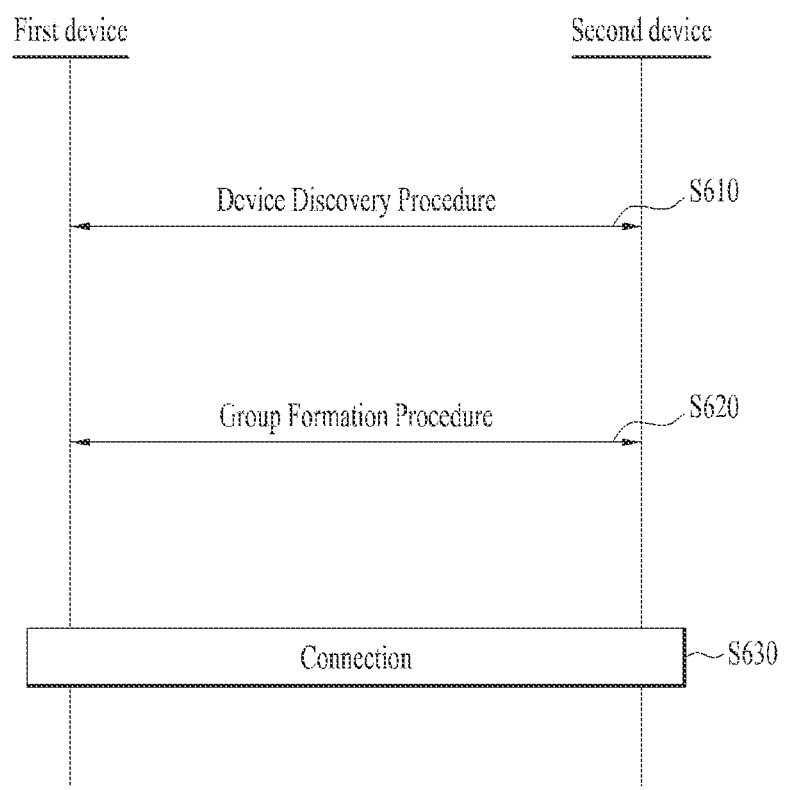
FIG. 6 is a view schematically showing a communication procedure using Wi-Fi Direct according to an embodiment of the present invention.

FIG. 6 is a view schematically showing a communication procedure using Wi-Fi Direct according to an embodiment of the present invention.

Referring to FIG. 6, a first device and a second device supporting Wi-Fi Direct may perform a Device Discovery Procedure (S610) and a Group formation Procedure (S620) such that the first device and the second device are connected to each other (S630).

The Device Discovery Procedure (S610) is a procedure of searching for devices supporting Wi-Fi Direct to exchange information necessary for connection. In this procedure, the respective devices may exchange the information described in Tables 1, 2, and 3. In the present invention, a group owner determination operation may be further performed in the Device Discovery Procedure (S610).

The Group formation Procedure (S620) is a procedure of forming a group of devices to be connected, e.g. a procedure of exchanging information necessary for group formation. In this procedure, the respective devices may exchange information necessary for group formation. One piece of the information necessary for group formation may be a group owner intent value. In the present invention, an operation of dynamically setting the group owner intent value may be further performed in the Group formation Procedure (S620).

Figure 7:
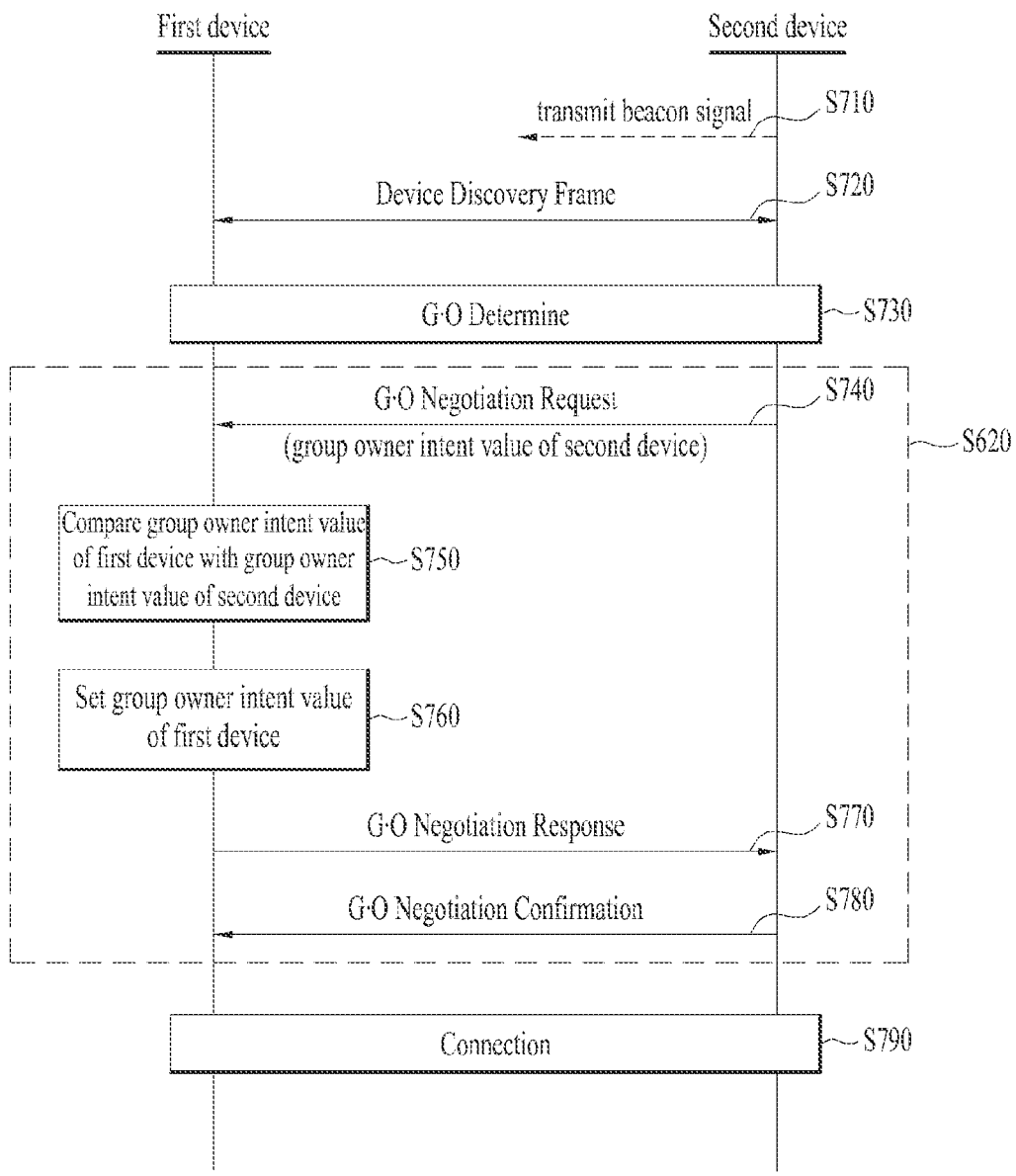
FIG. 7 is a view showing the communication procedure using Wi-Fi Direct according to the embodiment of the present invention.

FIG. 7 is a view showing the communication procedure of FIG. 6 in detail.

Referring to FIG. 7, the first device may sense a beacon signal transmitted from the second device (S710) to perform a device discovery procedure with the second device. Specifically, the first device may exchange a Device Discovery Frame with the second device to exchange information necessary for connection (S720). The Device Discovery Frame may contain the information described in Tables 1, 2, and 3. In the device discovery procedure, the first device may determine a group owner (GO) (S730). The first device may determine the GO based on the service information contained in the Device Discovery Frame. Determination of the GO has been previously described with reference to FIG. 3 and, therefore, a repeated description thereof will be omitted.

The first device may perform a group formation procedure (S620) with the second device. Specifically, the first device may receive a GO Negotiation Request from the second device (S740). The GO Negotiation Request may further contain the information described in Tables 1 and 2 in addition to the group owner intent value. The first device may compare the group owner intent value of the first device with the group owner intent value of the second device (S750) to set the group owner intent value of the first device such that the group owner intent value of the device determined as the group owner at step S730 is greater than the group owner intent value of the device determined as the group client (S760).

The first device may transmit a GO Negotiation Response containing the set group owner intent value of the first device to the second device (S770) such that the second device confirms the group owner intent value of the first device. Through this procedure, the first device and the second device may decide the group owner and the group client and the second device may transmit GO Negotiation Confirmation to the first device (S780). In this way, the group formation procedure is completed. Upon completion of the group formation procedure, communication connection between the first device and the second device may be achieved (S790). Of course, an Authentication procedure and an Association procedure may be performed after the group formation procedure is completed. However, these procedures are not directly connected to the present invention and, therefore, a description thereof will be omitted.

In a wireless communication method according to an embodiment of the present invention as described above, it is possible to decide a device determined using network information as a group owner during connection using Wi-Fi Direct without changing the specifications of existing Wi-Fi Direct.

Specifically, a group owner suited to a specific network condition may be determined and a group owner intent value may be dynamically set to decide that a device determined as the group owner is the group owner, thereby achieving efficient group application.

In one embodiment of the present invention, the above method (flowchart) may be implemented as code that can be written in a processor-readable recording medium. The processor-readable recording medium may include, for example, a ROM, a RAM, a CD-ROM, a magnetic tape, a floppy disk, and an optical data storage device and may be implemented in the form of a carrier wave (for example, transmission over the Internet).

The device for performing communication using Wi-Fi Direct as described above is not limited to the configurations and methods of the exemplary embodiments set forth herein. The exemplary embodiments may be selectively combined in part or in whole to form various embodiments.

As is apparent from the above description, in the communication method according to the present invention, it is possible to determine and set a group owner through comparison in network information while an existing Wi-Fi Direct function is maintained.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. An inter-device communication method performed at a first device comprising:
    searching for a second device supporting inter-device communication;
    receiving second network information and a second group owner intent value from the searched second device;
    determining that one of the first and second devices is a group owner based on the received second network information and first network information of the first device and the other one of the first and second devices is a group client, wherein each of the first and second network information comprises at least one of type information indicating a server device or a client device, network support information, network necessity information, or network setting information;
    setting a first group owner intent value of the first device to be greater than the second group owner intent value when the first device is determined as the group owner; and
    setting the first group owner intent value to be less than the second group owner intent value when the first device is determined as the group client.

2. The inter-device communication method according to claim 1, wherein the determining comprises determining the group owner using the received second network information and the first network information according to a group owner determination criterion.

3. The inter-device communication method according to claim 1, wherein, when the first device is determined as the group owner, the setting of the first group owner intent value comprises:
    comparing the first group owner intent value with the second group owner intent value; and
    setting the first group owner intent value such that the set first group owner intent value is greater than the second group owner intent value when the compared first group owner intent value is less than the second group owner intent value.

4. The inter-device communication method according to claim 1, wherein, when the first device is determined as the group client, the setting of the first group owner intent value comprises:
    comparing the first group owner intent value with the second group owner intent value; and
    setting the first group owner intent value such that the set first group owner intent value is less than the second group owner intent value when the compared first group owner intent value is greater than the second group owner intent value.

5. The inter-device communication method according to claim 1, further comprising transmitting the set first group owner intent value to the second device.

6. A first device for performing inter-device communication comprising:
    a receiver configured to search for a second device supporting inter-device communication and to receive second network information and a group owner intent value from the searched second device; and
    a processor configured to:
        determine that one of the first and second devices is a group owner based on the received second network information and first network information of the first device and the other one of the first and second devices is a group client, wherein each of the first and second network information comprises at least one of type information indicating a server device or a client device, network support information, network necessity information, or network setting information;
        set a first group owner intent value of the first device to be greater than the second group owner intent value when the first device is determined as the croup owner; and
        set the first group owner intent value to be less than the second group owner intent value when the first device is determined as the group client.

7. The first device according to claim 6, wherein the processor is further configured to determine the group owner using the received second network information and the first network information according to a group owner determination criterion.

8. The first device according to claim 6, wherein, when the first device is determined as the group owner, the processor is further configured to:
    compare the first group owner intent value with the second group owner intent value; and
    set the first group owner intent value such that the set first group owner intent value is greater than the second group owner intent value when the compared first group owner intent value is less than the second group owner intent value.

9. The first device according to claim 6, wherein, when the first device is determined as the group client, the processor is further configured to compare the first group owner intent value with the second group owner intent value; and
    set the first group owner intent value such that the set first group owner intent value is less than the second group owner intent value when the compared first group owner intent value is greater than the second group owner intent value.

10. The first device according to claim 6, further comprising a transmitter configured to transmit the set first group owner intent value to the second device.

* * * * *